(12) United States Patent
Maguire

(10) Patent No.: US 10,421,624 B2
(45) Date of Patent: Sep. 24, 2019

(54) METHOD FOR LOW PROFILE RECEIVER OPERATION

(71) Applicant: Stephen B. Maguire, West Chester, PA (US)

(72) Inventor: Stephen B. Maguire, West Chester, PA (US)

(*) Notice: Subject to any disclaimer, the term of this patent is extended or adjusted under 35 U.S.C. 154(b) by 0 days.

(21) Appl. No.: 15/827,724

(22) Filed: Nov. 30, 2017

(65) Prior Publication Data

US 2018/0079603 A1   Mar. 22, 2018

Related U.S. Application Data

(60) Division of application No. 15/012,001, filed on Feb. 1, 2016, which is a continuation-in-part of application No. 29/550,569, filed on Jan. 5, 2016.

(51) Int. Cl.
| | |
|---|---|
| *B65G 53/60* | (2006.01) |
| *B65G 53/24* | (2006.01) |
| *B65G 53/34* | (2006.01) |
| *B29B 13/10* | (2006.01) |
| *B65G 53/40* | (2006.01) |
| *B65G 53/46* | (2006.01) |
| *B29B 7/60* | (2006.01) |

(52) U.S. Cl.
CPC ............ *B65G 53/60* (2013.01); *B29B 7/60* (2013.01); *B29B 13/10* (2013.01); *B65G 53/24* (2013.01); *B65G 53/34* (2013.01); *B65G 53/40* (2013.01); *B65G 53/46* (2013.01); *B65G 2201/042* (2013.01)

(58) Field of Classification Search
CPC ...... B65G 53/24; B65G 53/60; B65G 69/182; B65G 69/183

USPC ........ 406/151, 152, 153, 171, 172; 414/291; 137/544, 550; 222/350
See application file for complete search history.

(56) References Cited

U.S. PATENT DOCUMENTS

| | | | |
|---|---|---|---|
| 2,161,190 | A | 6/1939 | Paull |
| 3,111,115 | A | 11/1963 | Best |
| 3,115,276 | A | 12/1963 | Johanningmeier |
| 3,209,898 | A | 10/1965 | Beebe et al. |
| 3,348,848 | A | 10/1967 | Lucking et al. |
| 3,470,994 | A | 10/1969 | Schnell et al. |

(Continued)

FOREIGN PATENT DOCUMENTS

| | | |
|---|---|---|
| DE | 3541532 A1 | 5/1986 |
| DE | 3923241 A1 | 1/1991 |

(Continued)

OTHER PUBLICATIONS

Brochure entitled "Plastic Molders and Extruders: published by Maguire Products, Inc., 1995".

(Continued)

*Primary Examiner* — Joseph A Dillon, Jr.
(74) *Attorney, Agent, or Firm* — Fox Rothschild LLP

(57) ABSTRACT

A method for temporary storage of granular material in a receiver having a horizontally elongated chamber within a housing, the chamber having a convex triangular cross-section and a dump flap defining a bottom vertex of the triangular cross-section, with a horizontal air/vacuum resin material inlet connecting to the chamber, and a horizontal air/vacuum outlet leading from and connected to the chamber.

13 Claims, 13 Drawing Sheets

(56) References Cited

U.S. PATENT DOCUMENTS

| | | | |
|---|---|---|---|
| 3,486,309 | A | 12/1969 | Wild |
| 3,570,542 | A | 3/1971 | Otto et al. |
| 3,829,165 | A | 8/1974 | Boon |
| 3,959,636 | A | 5/1976 | Johnson et al. |
| 3,985,262 | A | 10/1976 | Nauta |
| 4,019,641 | A | 4/1977 | Merz |
| 4,026,442 | A | 5/1977 | Orton |
| 4,108,334 | A | 8/1978 | Moller |
| 4,148,100 | A | 4/1979 | Moller |
| 4,194,859 | A | 3/1980 | Boon |
| 4,219,136 | A | 8/1980 | Williams et al. |
| 4,227,893 | A | 10/1980 | Shaddock |
| 4,294,020 | A | 10/1981 | Evans |
| 4,354,622 | A | 10/1982 | Wood |
| 4,402,436 | A | 9/1983 | Hellgren |
| 4,454,943 | A | 6/1984 | Moller |
| 4,475,672 | A | 10/1984 | Whitehead |
| 4,498,783 | A | 2/1985 | Rudolph |
| 4,525,071 | A | 6/1985 | Horowitz et al. |
| 4,564,374 | A | 1/1986 | Hofmann |
| 4,581,704 | A | 4/1986 | Mitsukawa |
| 4,705,083 | A | 11/1987 | Rossetti |
| 4,756,348 | A | 7/1988 | Moller |
| 4,793,711 | A | 12/1988 | Ohlson |
| 4,830,508 | A | 5/1989 | Higuchi et al. |
| 4,848,534 | A | 7/1989 | Sandwall |
| 4,850,703 | A | 7/1989 | Hanaoka et al. |
| 5,110,521 | A | 5/1992 | Moller |
| 5,116,547 | A | 5/1992 | Tsukahara et al. |
| 5,132,897 | A | 7/1992 | Allenberg |
| 5,143,166 | A | 9/1992 | Hough |
| 5,147,152 | A * | 9/1992 | Link ................ B29C 47/10 406/1 |
| 5,148,943 | A | 9/1992 | Moller |
| D331,248 | S | 11/1992 | Yeh |
| 5,172,489 | A | 12/1992 | Moller |
| 5,178,652 | A | 1/1993 | Huttlin |
| 5,180,407 | A | 1/1993 | DeMarco |
| 5,225,210 | A | 7/1993 | Shimoda |
| 5,252,008 | A | 10/1993 | May, III et al. |
| 5,261,743 | A | 11/1993 | Moller |
| 5,285,930 | A | 2/1994 | Nielsen |
| 5,340,949 | A | 8/1994 | Fujimura et al. |
| 5,341,961 | A | 8/1994 | Hausam |
| 5,423,455 | A | 1/1995 | Ricciardi et al. |
| 5,651,401 | A | 7/1997 | Cados |
| 5,843,513 | A | 1/1998 | Wilke et al. |
| 5,767,453 | A | 6/1998 | Wakou et al. |
| 5,767,455 | A | 6/1998 | Mosher |
| 5,780,779 | A | 7/1998 | Kitamura et al. |
| 5,791,830 | A | 8/1998 | Fort et al. |
| 5,884,654 | A | 3/1999 | Oike |
| 6,068,429 | A | 5/2000 | Schultheis |
| 6,089,794 | A | 7/2000 | Maguire |
| 6,152,656 | A | 11/2000 | Curtis et al. |
| 6,364,579 | B1 | 4/2002 | Gerber |
| 6,379,086 | B1 | 4/2002 | Goth |
| 6,413,020 | B1 | 7/2002 | Davison |
| 6,486,481 | B1 * | 11/2002 | Tigera ................ B29B 13/08 250/435 |
| 6,638,344 | B2 | 10/2003 | Horton et al. |
| 6,936,085 | B2 | 8/2005 | DeMarco |
| 7,066,689 | B2 | 6/2006 | Maguire |
| 7,407,346 | B2 | 8/2008 | McConnell |
| 7,459,003 | B2 | 12/2008 | Crockett et al. |
| 7,550,023 | B2 | 6/2009 | Schuster et al. |
| 8,070,844 | B2 | 12/2011 | Maguire |
| D651,623 | S | 1/2012 | Stillwell |
| D696,318 | S | 12/2013 | Ludwick |
| 8,753,432 | B2 | 6/2014 | Maguire |
| D726,793 | S | 4/2015 | von Wyl |
| D736,281 | S | 8/2015 | Phillips |
| D781,358 | S | 3/2017 | Pichler |
| 2002/0190146 | A1 * | 12/2002 | Irwin ................ B02C 18/142 241/80 |
| 2005/0039816 | A1 | 2/2005 | Maguire |
| 2005/0120881 | A1 | 6/2005 | Sporre et al. |
| 2006/0086070 | A1 | 4/2006 | Althouse et al. |
| 2006/0093444 | A1 | 5/2006 | McConnell |
| 2006/0147278 | A1 | 7/2006 | Boring et al. |
| 2007/0039290 | A1 | 2/2007 | Lee |
| 2011/0229276 | A1 | 9/2011 | Eder |
| 2012/0160866 | A1 | 6/2012 | Maguire |
| 2012/0301230 | A1 | 11/2012 | Marchesini |
| 2014/0201944 | A1 | 7/2014 | Maguire |
| 2014/0205386 | A1 | 7/2014 | Maguire |
| 2015/0110565 | A1 | 4/2015 | Harris |
| 2016/0122137 | A1 | 5/2016 | Schilling |
| 2016/0214793 | A1 | 7/2016 | Maguire |
| 2016/0280473 | A1 | 9/2016 | Veselov |

FOREIGN PATENT DOCUMENTS

| | | |
|---|---|---|
| DE | 4323295 C1 | 2/1995 |
| EP | 0507689 A2 | 10/1982 |
| EP | 0318170 A2 | 5/1989 |
| EP | 0587085 A2 | 3/1994 |
| EP | 0743149 A1 | 11/1996 |
| FR | 2109840 A5 | 5/1972 |
| FR | 2235775 A1 | 7/1974 |
| FR | 2517087 A1 | 5/1983 |
| GB | 2081687 A | 2/1982 |
| JP | 01-235604 | 9/1989 |
| JP | 04-201522 | 7/1992 |
| JP | 06-114834 | 4/1994 |
| JP | 11-320610 A | 11/1999 |
| KR | 10-2014-0085858 A | 7/2014 |
| KR | 10-1576702 B1 | 12/2015 |

OTHER PUBLICATIONS

Five page brochure entitled "Blending power: GXB Blender the Better Alternative" of Mould-Tek, circa 1998.

Two page brochure entitled "Mould-Tek Bulk Handling Systems" published by Mould-Tek Industries, Inc. in Canada, circa 1993.

Advertisement entitled "Machinery and Systems for Extrusion is Our Only Business" by Process Control Corporation, circa 1993.

Advertisement entitled "Weigh Blender Delivers Unmatched Accuracy" by Universal Dynamics, Inc., circa 1993.

Advertisement entitled "A Full Line-up of Blender Solutions . . . Priced Right" by HydReclaim, circa 1993.

Advertisement entitled "New From HydReclaim—Now Processors Can Economically Achieve Continuous Gravimetric Blending" by HydReclaim, circa 1993.

Article entitled "Control Loading Systems" from Plastics Technology, Oct. 1995, p. 41.

Advertisement "Introducing our 400 VME-II Gravimetric Blender" by HydReclaim Corporation, circa 1993.

Four page brochure entitled "Gravimix Better Quality through Research", circa 1993.

Four page brochure entitled "Conomix Plus Volumetric Blender" dated Aug. 1993.

Four page brochure entitled "Conair Franklin Autocolor Y Mezclador" dated Mar. 1995.

Two-sided flyer entitled "GB 140 Series Compact Auto Weigh Blender" published by Conair Franklin in the United States, Jun. 1994.

Six page brochure entitled "Piovan Gravimetric Blenders MDW" published by Piovan Sri, Oct. 1993, Venezia, Italy.

Four page brochure entitled "When you Weigh it All Up . . . " published by Ferlin Trading, Holland, circa 1993.

Thirty-two page color catalog entitled "Maguire Color Blending Equipment" published by Maguire Products, Inc., 1993.

Sheet of 2 photographs of Mould-Tek gravimetric blender, circa 1993.

Sheet of 2 photographs of Motan gravimetric blender and feeding system with Maguire Products, Inc. controls, circa 1993.

Sheet of 3 photographs of UNA-DYN gravimetric blender, circa 1993.

(56) References Cited

OTHER PUBLICATIONS

Sheet of 2 photographs of Maguire Products, Inc. gravimetric blender with Conair hoppers and feeding system, circa 1993.
Sheet of 1 photograph of Hydracolor gravimetric blender, circa 1993.
Two-sided flyer entitled "Gravimix, The New Gravimetric Blending Generation" published by Ferlin, De demsvaard, Holland, circa 1993.
Two-sided color brochure entitled "Convey, Blend, Dry" published by Novatec, Inc., undated.
Three page two-sided color brochure entitled "Accuracy, flexibility and performance are at your fingertips with ConveyPacer III Series "S" Controller" of Mould-tek, 1999.
Seven page two-sided color brochure plus cover entitled "Exac-U-Batch Series Weigh Scale Blenders: Engineered to be the ultimate blend of precision and control!" of Mould-tek, 2000.
Three page two-sided color brochure entitled "We have the building blocks to integrate your entire plastics bulk handling system." of Mould-tek, 1999.
Four page two-sided color brochure entitled AEC Whitlock: Vacuum Conveying Systems: VacTrac™ Series of AEC, Inc., 1991.
One page color brochure entitled "AEC Engineering What's Next: One Touch. Two Wires. Total Control." of AEC, Inc., 2000.
One page two-sided color brochure entitled Vactrac™ Series Vacuum Conveying Controls of AEC, Inc., 2000.
One page two-sided color brochure entitled "Vacuum Conveying Systems: VacTrac™ Series 8-Station SMART™ Control" of AEC, Inc., 1997.
Two page two-sided color brochure entitled "Model GXB-2202 Exac-U-Batch Gravimetric Scale Blender: Accurate weigh scale blending under precise computer control" of Mould-tek, 2000.
Forty-four page two-sided brochure including cover and back pages entitled "Maguire: Auxiliary equipment for the plastics industry" of Maguire Products, Inc., Oct. 2000.
Two page two-sided color brochure entitled "WDMR Series Compact Dryers" of AEC Whitlock, 1998.
Two page two-sided color reprint entitled "10 most frequently asked questions about Dryers" by Joseph Dziediz, AEC/Whitlock, from Plastics Technology, Jan. 1998.
Two page two-sided color brochure entitled "Drying Systems: WD Series High Capacity Dehumidifying Dryers" of AEC Whitlock, 1997.
Three page two-sided color brochure entitled "Portable Drying and Conveying Systems: Nomad™ Series Portable Dryers", AEC Whitlock, 1998.
Two page two-sided color brochure entitled "Drying Systems: WD Series Dehumidifying Dryers" of AEC Whitlock, 1997.
Five page two-sided color brochure entitled "AEC Auxiliaries as Primary", AEC, Inc., 1999.
19 page document entitled "Model MLS—Clear Vu Eight Component Vacuum Loading System: Operation Manual" of Maguire Products, Inc. dated May 4, 1999.
One page two-sided color brochure entitled "Maguire Clear-Vu™ Loading System" of Maguire Products, Inc.
Eight page two-sided color brochure entitled "Novatec Inc. Material Conveying Solutions for the Plastics Industry", 1999.
Two page two-sided color brochure entitled Maguire Model MPM Pre-Mixers of Maguire Products, Inc., Apr. 1997.
One page, two-sided color brochure entitled "Bulk handling power: the manufacturer of the world's most advanced blender gives you the same performance in bulk handling systems" of Mould-Tek, dated Apr. 1999.
Instructions for the Model GVL Glass-Vu Loader, Model: GVL-10, Maguire Products Inc., Oct. 6, 2009 (15 pages).
Model MLS Clear Vu® Eight Component Vacuum Loading System, Installation-Operation-Maintenance, Maguire Products, Inc., Jul. 25, 2010 (30 pages).
MPL Series—ML Series® Venturi Loaders Instruction Manual, Maguire Products, Inc., Aug. 9, 2010 (23 pages).

* cited by examiner

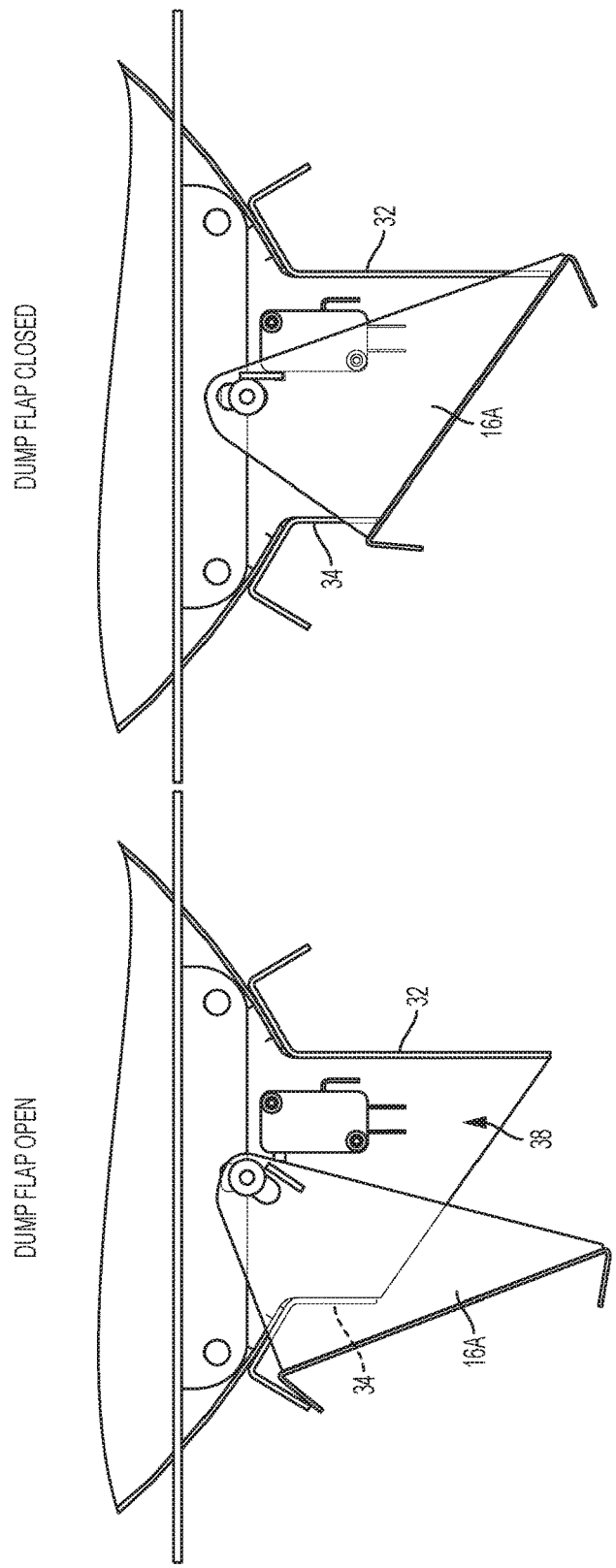

METHOD FOR LOW PROFILE RECEIVER OPERATION

CROSS-REFERENCE TO RELATED PATENT APPLICATION

This patent application is a 35 USC 120 division of co-pending U.S. patent application Ser. No. 15/012,001 filed 1 Feb. 2016 in the name of Stephen B. Maguire, and published on 6 Jul. 2017 as U.S. patent publication 2017/0190518 A1. Application Ser. No. 15/012,001 is a continuation-in-part of application Ser. No. 29/550,569 filed 5 Jan. 2016. The instant application claims the priority of the 1 Feb. 2016 filing date of the '001 application under 35 USC 120 and by virtue of such priority claim the instant application also claims the priority of the 5 Jan. 2016 filing date of co-pending application Ser. No. 29/550,569 under 35 USC 120.

STATEMENT REGARDING FEDERAL FINANCING RESPECTING THIS INVENTION

Not applicable.

BACKGROUND OF THE INVENTION AND DESCRIPTION OF THE PRIOR ART

The terms "air/vacuum", and ""vacuum/air" and "air/vacuum stream", etc. are used synonymously and interchangeably herein to denote a moving stream of air, at sub-atmospheric pressure, drawn by a vacuum pump. Such moving "air/vacuum" streams are conventionally used to convey granular plastic resin material in facilities in which the granular plastic resin is molded or extruded into finished or semi-finished plastic parts.

"Receiver" is a term used in the plastics industry to denote devices that temporarily hold granular plastic resin material before that granular plastic resin material is loaded into a hopper for subsequent processing by a compression or injection molding press or an extruder. As used herein, the term "process machine" denotes collectively such compression molding machines, injection molding machines and extruders.

Receivers typically include a vacuum chamber that effectively pulls granular plastic resin material into the receiver due to the vacuum that exists within the vacuum chamber. A vacuum pump is connected to the receiver to create the vacuum required within the vacuum chamber to pull granular plastic material into the receiver. This facilitates moving the granular plastic resin material from a remote location to a hopper, to be fed by the receiver, with the hopper being typically located over a process machine. The receiver and the vacuum pump are typically part of a larger resin conveying system that conveys the granular plastic resin from a supply to the receiver.

Receivers may be located over surge bins or over other temporary storage units in addition to hoppers.

Receivers load in cycles. Specifically, the receiver loads with granular plastic resin material and then dumps the granular plastic resin material as one operating cycle. Accordingly, the receiver requires some sort of a collection bin or surge hopper below the receiver to receive the granular plastic resin material as it is fed to the process machine.

Typically the vacuum source is remote, namely it is not integrated into the receiver itself. The receiver, in its most simple, elementary form, is a simple chamber that has a vacuum line connected to it to pull air from the chamber to create a vacuum inside the chamber. The vacuum then draws granular plastic resin material into the chamber portion of the receiver. The receiver accordingly has a material line connected to it for granular plastic resin material to flow in or, more accurately, to be pulled in by the vacuum, into the chamber portion of the receiver. The receiver typically has a valve or gate at the bottom of the receiver to allow the granular plastic resin material to drop out of the bottom of the receiver when the vacuum is broken or removed or when the valve or gate is otherwise opened electrically or pneumatically. Since the receiver has a storage area with a relatively large volume and cross-sectional area relative to the conduit through which the air/vacuum and granular material mixture travels, when the mixture reaches the receiver storage area, speed of the moving air/volume stream drops. The kinetic energy of the stream is no longer sufficient to carry the granular resin, so the resin falls to the bottom of the receiver.

All known receivers have these characteristics in common.

SUMMARY OF THE INVENTION

An important characteristic of the inventive low profile receiver is the very low profile the receiver offers when installed. Process machines often have a number of auxiliary items mounted above the throats of the process machines. These may include magnetic drawers; additive feeders; simple material hoppers; large drying hoppers; gravimetric blenders; and other devices. A receiver is typically mounted on top of this collection of equipment. Such a stack-up of items may interfere with overhead restrictions or limitations such as the ceiling or a mezzanine in a plastics processing facility. Access to the receiver for service may also be a problem. Safety issues arise with excessive height.

In the low profile receiver according to the invention, in one configuration the receiver adds only 7 inches of height. This is to be contrasted to current receiver designs that require from 15 to 25 inches of added height due to their configuration.

The low profile receiver of the invention includes a filter blow off, which clears the entire filter effectively. The cleaning is so effective that it virtually eliminates periodic filter cleaning that is required by conventional filter blow off designs in known receivers.

True full range cloth filters, when used in conventional receivers always clog, and accordingly, conventional receivers most often use only metal screens for filters. The metal screen stops the granular resin material pellets, but does not stop or catch dust and fines. The passage of dust and fines requires an additional filter at the vacuum pump to catch the dust and the fines which otherwise would damage the vacuum pump.

The low profile receiver of the invention includes a full cloth filter that stops dust and fines; the full cloth filter is easily cleaned every cycle by the filter blow off device.

In one of its aspects, this invention provides a receiver having a horizontally elongated body with an interior chamber. A horizontal granular plastic material inlet conduit communicates with the interior chamber of the elongated body. A horizontal vacuum outlet conduit connects to the elongated body. A removable dust and material fines, preferably cloth, filter is positioned between the inlet and outlet conduits and collects dust and material fines before the dust and material fines can enter the vacuum outlet conduit leading to the vacuum pump. With the cloth filter catching the dust and material fines, no filter is required at the vacuum pump.

The receiver further includes a blaster for directing an air blast at the filter in order to clean the filter of retained dust and material fines. An outlet dump flap extends the longitudinal length of a lower extremity of the longitudinally elongated housing portion of the receiver in which the granular resin material is stored. The outlet dump flap is movable between an open position at which granular plastic material in the housing can flow freely downwardly out of the housing, and a closed position at which the dump flap defines a part of the bottom of the chamber. With the dump flap extending the horizontal longitudinal length of the housing, the housing empties essentially instantaneously when the dump flap moves to the open position. As a result, the receiver empties much faster than know receivers.

The receiver body is preferably wider than it is high and preferably has a generally convex triangular transverse cross-section.

In yet another one of its aspects, this invention provides a method for temporary storage of granular resin material prior to processing thereof into a finished or semi-finished product by molding or extrusion. The method includes feeding an air/vacuum stream carrying the granular resin material in a first horizontal direction into a chamber under vacuum. The method proceeds by reducing velocity of the air/vacuum stream in the chamber, thereby causing granular material entrained the stream to fall to the chamber bottom. The method proceeds with passing the stream in a second horizontal direction through a filter and releasing the stream from the chamber in the first horizontal direction. A flap defining a bottom of the chamber swings to an open position in response to the weight of the material, permitting granular material to fall from the chamber.

In still another one of its aspects, this invention provides a receiver that has a longitudinally elongated body having an interior chamber extending the length of the body. A horizontal conduit is provided for inlet of an air/vacuum stream carrying granular resin material and communicating with the interior chamber of the elongated body. A horizontal air/vacuum outlet conduit is connected to the interior chamber of the elongated body. A dump flap extends horizontally along a lower extremity of the interior chamber and is movable between an open position at which granular plastic material in the chamber can flow freely downwardly out of the chamber, and a closed position at which the flap defines a bottom portion of the chamber.

In this aspect of the invention, the receiver has a dump flap extending the horizontal length of the chamber interior and further includes a dust and material fines filter between the inlet and outlet conduits for collecting dust and material fines before entering the vacuum outlet conduit, and further includes a blaster for directing an air blast at the filter to clean the filter of retained dust and material fines. The dump flap is movable rotationally between open and closed positions; the body of the receiver is wider than it is high; the dump flap swings under the influence of gravity to a closed position when the chamber is empty; the filter is a cloth filter; the inlet for the granular plastic material is in a lateral, vertically extending surface of the receiver.

In still further portions of this aspect of the invention, the outlet for the air/vacuum stream is in the lateral surface of the receiver; the body of the receiver has a convex triangular cross-section; the chamber has at least one convex wall; the chamber is longer than it is high, and the chamber is longer than it is wide.

In yet another one of its aspects, this invention provides a method for temporary storage of granular resin material prior to processing thereof into a finished or semi-finished product by molding or extrusion, where the method includes feeding an air/vacuum stream carrying the granular resin material horizontally into a chamber under vacuum. The method proceeds with reduction of velocity of the stream in the chamber, thereby causing granular material entrained in the stream to fall to the chamber bottom. The method next continues to draw the stream from the chamber thereby maintaining vacuum in the chamber. The method may conclude by releasing the vacuum horizontally from the chamber. A flap defining a bottom of the chamber swings to an open position due to the weight of the granular material resting in the bottom of the chamber, permitting granular material resting on the flap to fall from the chamber. In this aspect of the invention, desirably the air/vacuum stream passes through a cloth filter. Most desirably, the passing of the stream through the cloth filter is performed before releasing the vacuum from the chamber. Further desirably the stream passes horizontally through a cloth filter perpendicular to the stream.

In still another one of its aspects, this invention provides a receiver having a horizontally elongated chamber, where the chamber has a convex triangular cross-section. The chamber includes a dump flap defining a bottom vertex of the triangular cross-section. A horizontal air/vacuum resin material mixture inlet connects to the chamber while a horizontal air/vacuum outlet leads from the chamber and is connected to the chamber. A modular control section is removable from the housing within which the chamber resides, and manually actuable clips releasably retain the control segment in engagement with the housing.

In still another one of its aspects, this invention provides a receiver having an longitudinally elongated body, with an interior chamber extending the length of the body. A horizontal conduit for inlet of an air/vacuum stream carrying granular resin material communicates with the interior chamber of the elongated body. A horizontal air/vacuum outlet conduit connects to the interior chamber of the elongated body. A dust and material fines filter between the inlet and outlet conduits is provided for collecting dust and material fines and is positioned for filtration of the stream before entering the vacuum outlet conduit. The receiver yet further comprises a blaster for directing an air blast at the filter, in a direction opposite to that of the vacuum/air stream when it flows through the filter, to clean the filter of retained dust and material fines, and a dump flap extending horizontally along a lower extremity of the interior chamber, where the dump flap is movable between an open position at which granular plastic material in the chamber can flow freely downwardly out of the chamber, and a closed position at which the dump flap defines a bottom portion of the chamber.

In the preferred embodiment of the receiver, the dump flap is pivotable between a closed position and a housing open position. The outlet dump flap is weighted to swing to a closed position under the force of gravity and to remain closed in response to vacuum drawn within the receiver, allowing the receiver to fill. Once the vacuum draw to the housing portion of the receiver, in which the granular resin material conveyed into the receiver by an air/vacuum stream collects, is shut off, there is no internal vacuum force retaining the receiver dump flap in the closed position. The weight of the granular resin material on the dump flap causes the dump flap to move to the open position and the granular resin material falls downwardly, out of the receiver, due to gravity.

BRIEF DESCRIPTION OF THE DRAWINGS

FIG. 13 is a broken end view of the lower portion of the left end of the receiver illustrated in FIGS. 1 through 12 depicting the discharge chute and the left triangular portion of the dump flap, with the dump flap in an open position.

FIG. 14 is a broken end view of the lower portion of the receiver illustrated in FIGS. 1 through 13 depicting the discharge chute and the left triangular portion of the dump flap, with the dump flap in a closed position.

DETAILED DESCRIPTION OF THE INVENTION

Figure 1:
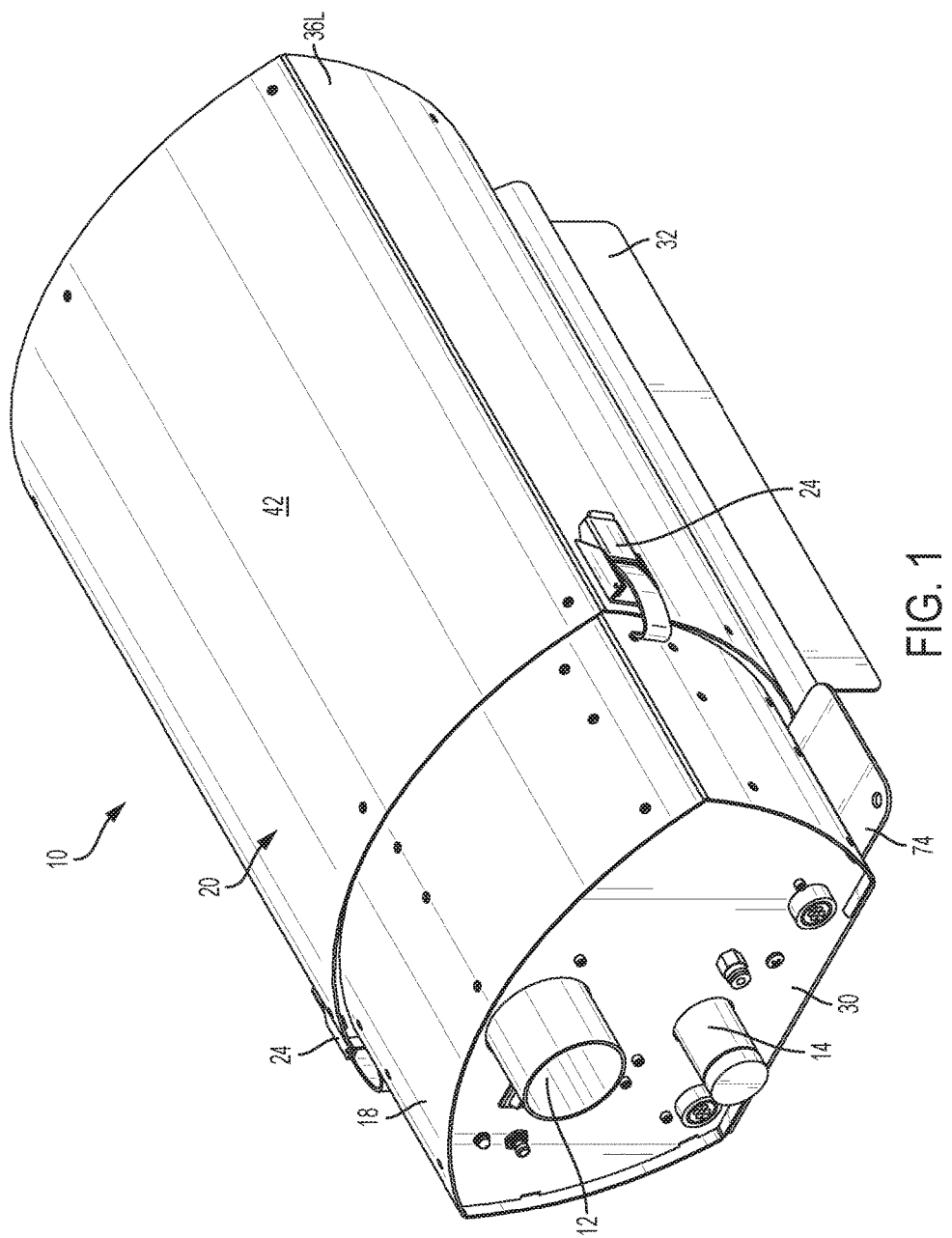
FIG. 1 is an isometric view of a low profile receiver in accordance with the invention, in which the top, left side and left end of the receiver are visible.

Referring to the drawings and particularly to FIG. 1, a receiver in accordance with the invention is designated generally 10. A horizontal material inlet tube 12 receives a moving air/vacuum stream carrying granular resin material for temporary storage of the granular resin material in receiver 10. Horizontal material inlet tube 12 is mounted in a vertically oriented first end plate 30. Also mounted in first end plate 30 is an air actuated piston-cylinder combination 14, which controls air/vacuum flow through receiver 10 in an on-off manner as described below.

A control section 17 of receiver 10 is maintained within a control section wrapper 18, where the control section wrapper 18 is illustrated in FIG. 1. Receiver 10 further includes a housing 20, which serves as a granular material storage receptacle or chamber for temporary storage of granular resin material therein. Control section wrapper 18 and the components therein are secured to housing 20 via several clip-type latches 24, two of which are visible in FIG. 1. These clip-type latches facilitate quick disassembly of receiver 10, allowing control section 17 within control section wrapper 18 to quickly be removed from the remainder of receiver 10 for adjustments, repairs, replacing the filter, and the like.

Receiver 10 further includes a horizontal outlet line 28 via which an air/vacuum stream is drawn from receiver 10 by a vacuum pump, which is not illustrated in the drawings. In FIG. 1, a portion of an inlet end horizontal blow-back support plate 74 is visible, extending out from under control section 17, which is not visible or numbered in FIG. 1 but is shown and numbered in others of the drawings.

Figure 2:
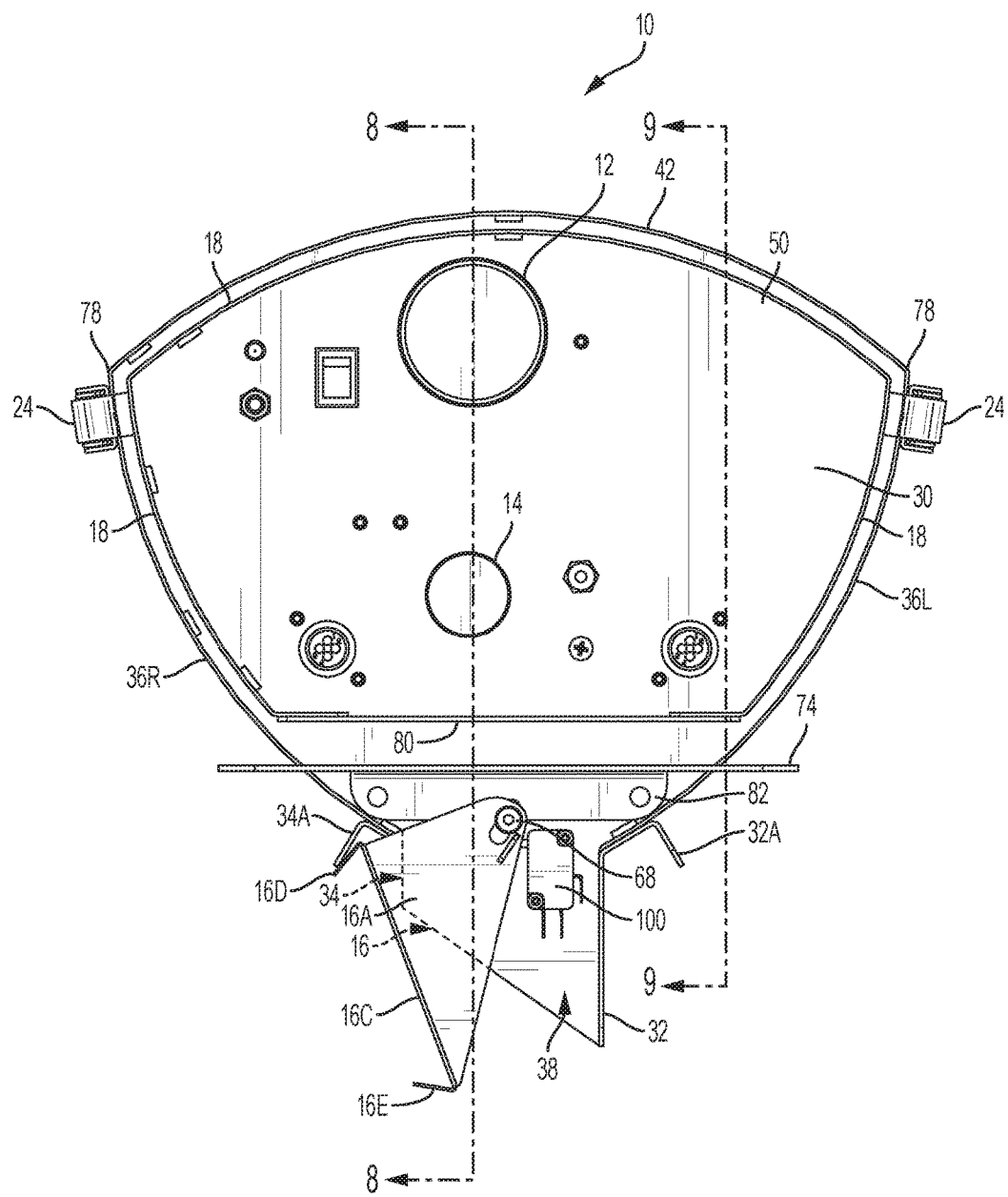
FIG. 2 is a view in elevation of the left or front end of the receiver illustrated in FIG. 1, with the receiver dump flap in the open position. Section lines 8-8 and 9-9 in FIG. 2 indicate where sections are taken that are presented in FIGS. 8 and 9 herein.
Figure 3:
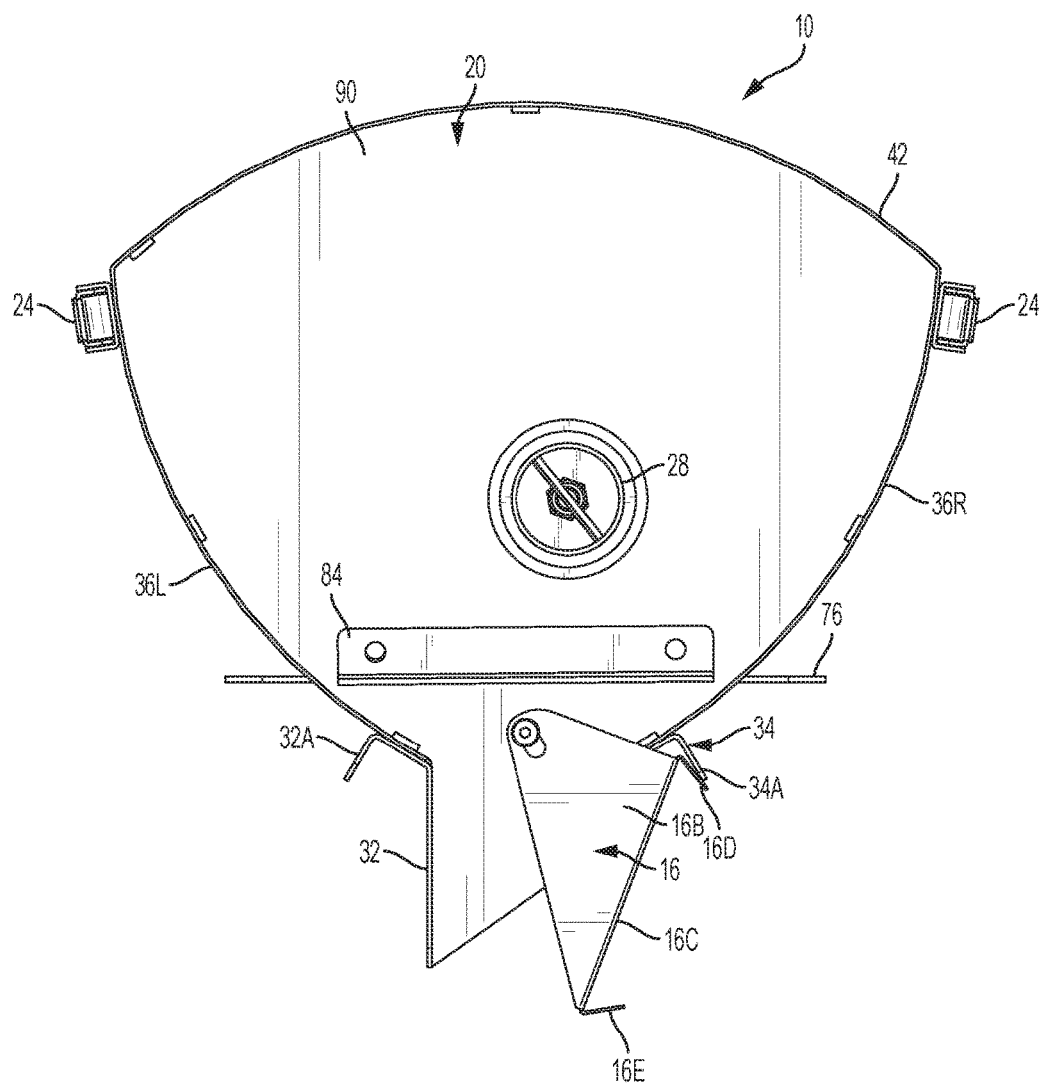
FIG. 3 is a view in elevation of the right or rear end of the receiver illustrated in FIGS. 1 and 2, with the receiver dump flap in the open position.

As illustrated in FIG. 1 and as particularly well-illustrated in FIGS. 2 and 3, housing 10 has convexly curved sides 36, with the sides being designated 36L and 36R for the left and right sides respectively. (As used herein, the term "left" denotes the portion of the receiver lateral surface that is visible in FIG. 1 and is to the viewer's right in FIGS. 2 and 3.) Still referring to FIG. 2 principally and also in part to FIG. 3, at the bottom of sides 36, extending from and fixed to sides 36L and 36R are a first bottom flange 32 and a second bottom flange 34, where first bottom flange 32 is longer in the vertical direction than is second bottom flange 34. Second bottom flange 34 is largely occluded in FIG. 2 by an end portion 16A of a dump flap 16.

Still referring principally to FIG. 2, dump flap 16 is mounted for pivotal movement with respect to a granular resin material discharge chute 38 formed by vertically downwardly extending portions of first and second bottom flanges 32, 34, with granular resin material discharge chute 38 running the longitudinal length of housing 20 portion of receiver 10 (The vertically downwardly extending portions of first and second bottom flanges 32, 34 are not separately numbered in the drawings). First and second bottom flanges 32, 34 have tabs designated 32a and 34a, which extend perpendicularly to housing sides 36 and facilitate fabrication, maintenance and operation of receiver 10.

Respective left and right sides 36 of housing 20 are denoted 36L and 36R for the left and right sides of receiver 10, where the left side of receiver 10 is the side visible in FIG. 1. When chute 38 is open due to dump flap 16 being in the position illustrated in FIGS. 2 and 3 and 13, granular resin material stored within housing 20 flows downwardly out of receiver 10 through chute 38 due to gravity.

In FIG. 2, the construction and configuration of receiver 10 is particularly well-shown. Receiver 10 and particularly housing portion 20 thereof are wider at the vertices or angles at which housing top 42 meets with sides 36L, 36R; these vertices or angles have been denoted 78 in FIG. 2. The ratio of the receiver 10 width, measured as the distance between vertices 78, and the height of receiver 10, as measured from the high point of housing top 42 to the horizontal support plate 80, both of which are visible in FIG. 2, is about 5:3, meaning that the housing 20 of receiver 10 is about 40% wider than it is high.

In FIG. 2, a dump flap is illustrated in the open position, whereby granular resin material may flow out of receiver 10 through chute 38. A left triangular portion of dump flap 16 is denoted 16A in FIG. 2. A longitudinally extending portion of dump flap 16 is denoted 16C in FIG. 2 and is visible only as a pair of closely spaced lines. Longitudinally extending portion 16C of dump flap 16 runs the longitudinal length of housing 20. Dump flap 16 is pivotally movable about a pair of pins 68, one of which is illustrated in FIG. 2.

Continuing to refer to FIG. 2, horizontal material inlet tube 12 and air powered piston-cylinder 14 are clearly illustrated as being mounted in front plate 50. Note in FIG. 2 that control section wrapper 18 defines an outer periphery of control section 17 and is slightly inboard of housing top 42 and housing sides 36L, 36R. Control section wrapper 18 connects with a horizontal support plate 80 illustrated in FIG. 2. Still referring to FIG. 2, a mounting flange 82 is rigidly secured and connected to an inlet end horizontal blow-back support plate 74 with a portion extending vertically downwardly therefrom. The downwardly extending portion of front mounting flange 82 is equipped with a pair of holes for mounting receiver 10 to associated adjacent equipment as required.

Referring to FIG. 3, the generally convex triangular shape, in transverse section, of housing portion 20 of receiver 10 is well-shown, with housing top 42 and housing sides 36L, 36R again appearing in their triangular convex shape. The outlet of material outlet line 28 is apparent in a rear end plate 90. A rear mounting flange 84 is mounted on an outlet end horizontal support plate 76 and has upwardly extending portions equipped with holes for mounting receiver 10 on auxiliary equipment. First bottom flange 32 is illustrated in FIG. 3. In FIG. 3, dump flap 16 is again visible, with right triangular portion 16B clearly shown, and with longitudinal portion 16C again appearing as a pair of lines indicating that longitudinal portion 16C runs away from the viewer and is perpendicular to the viewer in FIG. 3. An outlet end horizontal plate 76 is shown in FIG. 3.

Figure 4:
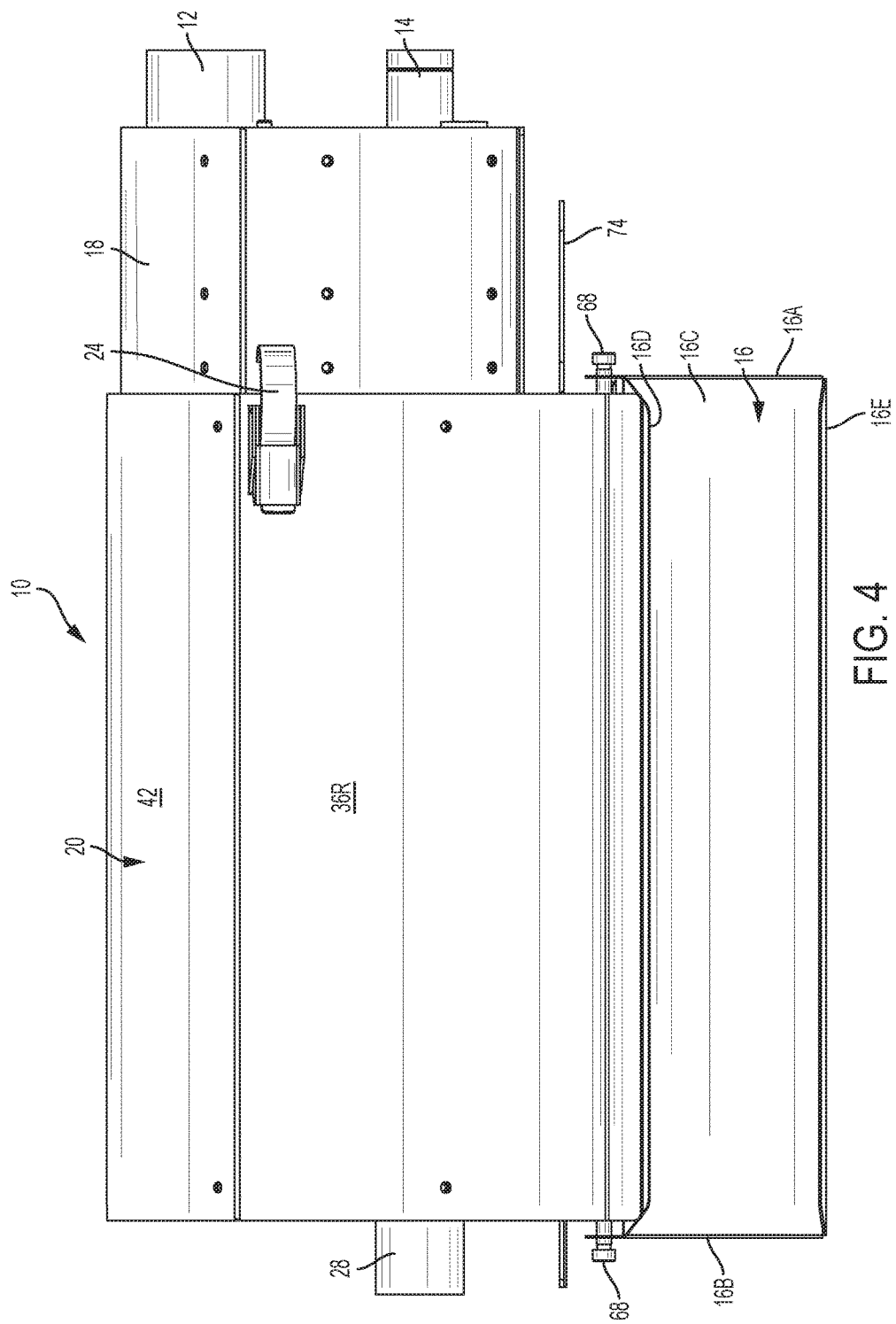
FIG. 4 is a view of the right side receiver illustrated in FIGS. 1, 2 and 3, with the receiver dump flap in an open position.

Referring to FIG. 4, receiver 10, housing 20, control section wrapper 18, material inlet tube 12, air piston-cylinder 14, and material outlet line 28 are all well shown. In FIG. 4, the two pins 68 about which dump flap 16 rotates are clearly shown, as is the longitudinally extending portion 16C of dump flap 16. A major longitudinally extending flange 16D and a minor longitudinally extending flange 16E are also visible in FIG. 4. FIG. 4, as noted above, depicts dump flap 16 in an open position as illustrated in FIG. 2, FIG. 3 and FIG. 13.

Figure 5:
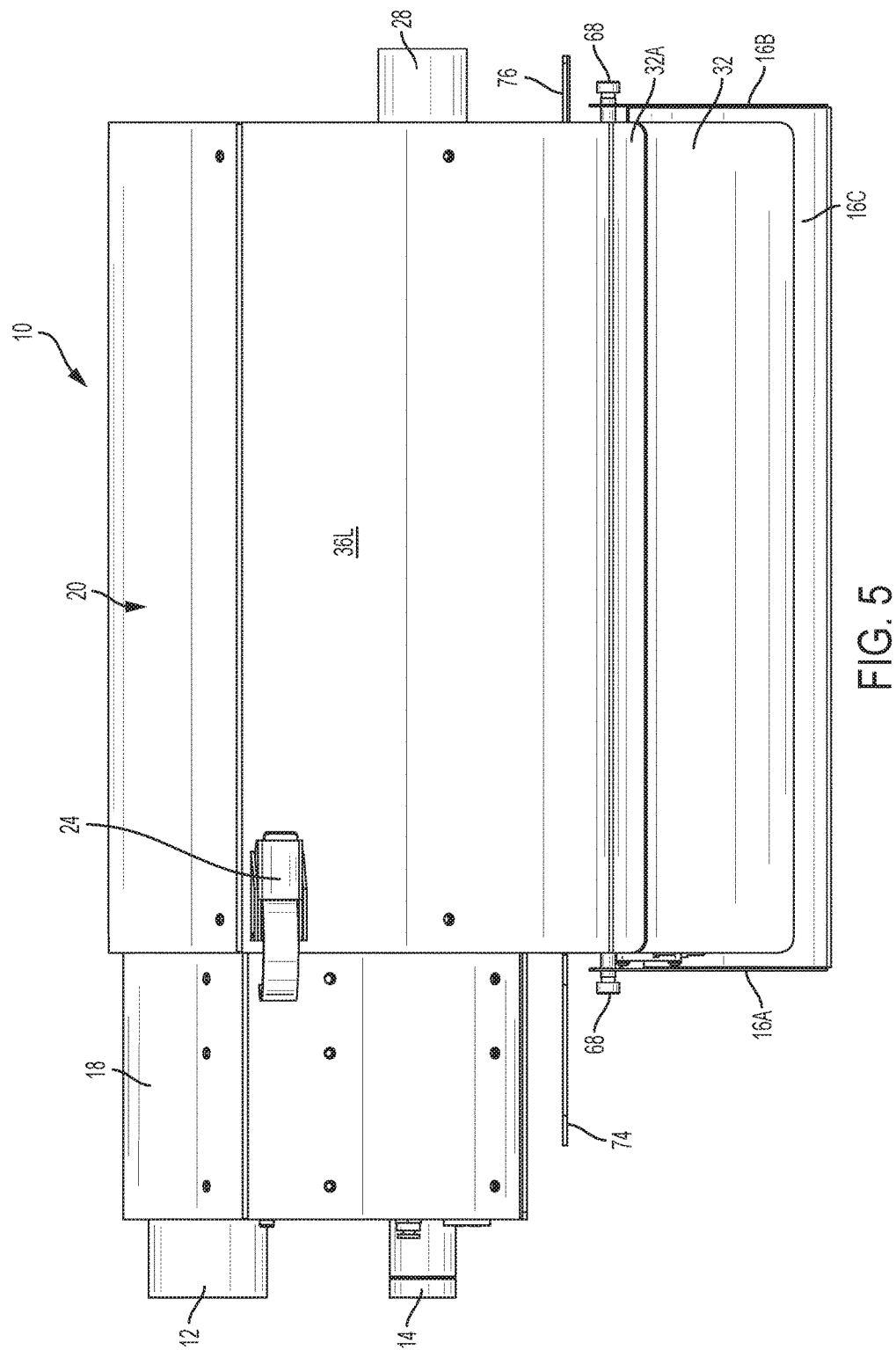
FIG. 5 is a view in elevation of the left side of the receiver illustrated in FIGS. 1, 2, 3 and 4, with the receiver dump flap in an open position.

Referring to FIG. 5, first bottom flange 32 is well illustrated as extending longitudinally the length of housing 20 to define a portion of outlet chute 38. Lip portion 32A denotes a lip portion of first bottom flange 32; lip portion 32A is also illustrated in FIG. 2. In FIG. 5, dump flap 16 is somewhat occluded by first bottom flange 32 as can be appreciated by comparing FIG. 5 with FIG. 2, and noting that FIG. 5 is a side view, whereas FIG. 2 is an end view. Pins 68, on which dump flap 16 is mounted and about which dump flap 16 rotates, are again illustrated in FIG. 5 as are material inlet tube 12, piston-cylinder 14, and outlet line 28, as well as inlet end horizontal blow-back support plate 74 and outlet end horizontal support plate 76.

Figure 6:
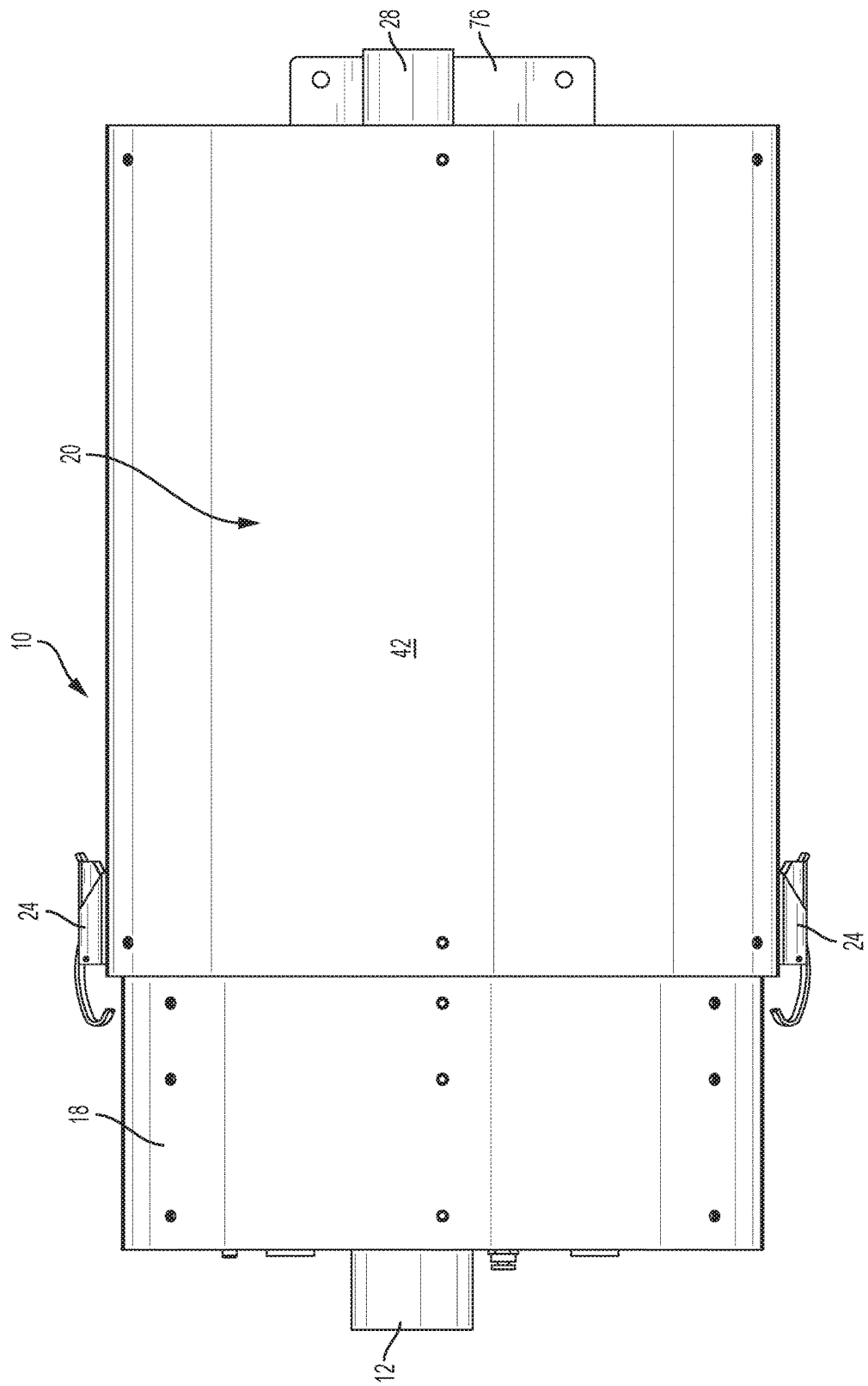
FIG. 6 is a view of the top of the receiver illustrated in FIGS. 1, 2, 3, 4, and 5.

In FIG. 6, the top of receiver 10, material inlet tube 12, outlet line 28, top 42, latches 24, control section wrapper 18 and outlet end horizontal support plate 76 are all illustrated. Dump flap 16 and the various parts thereof and associated therewith are occluded from view in the top view provided by FIG. 6.

Figure 7:
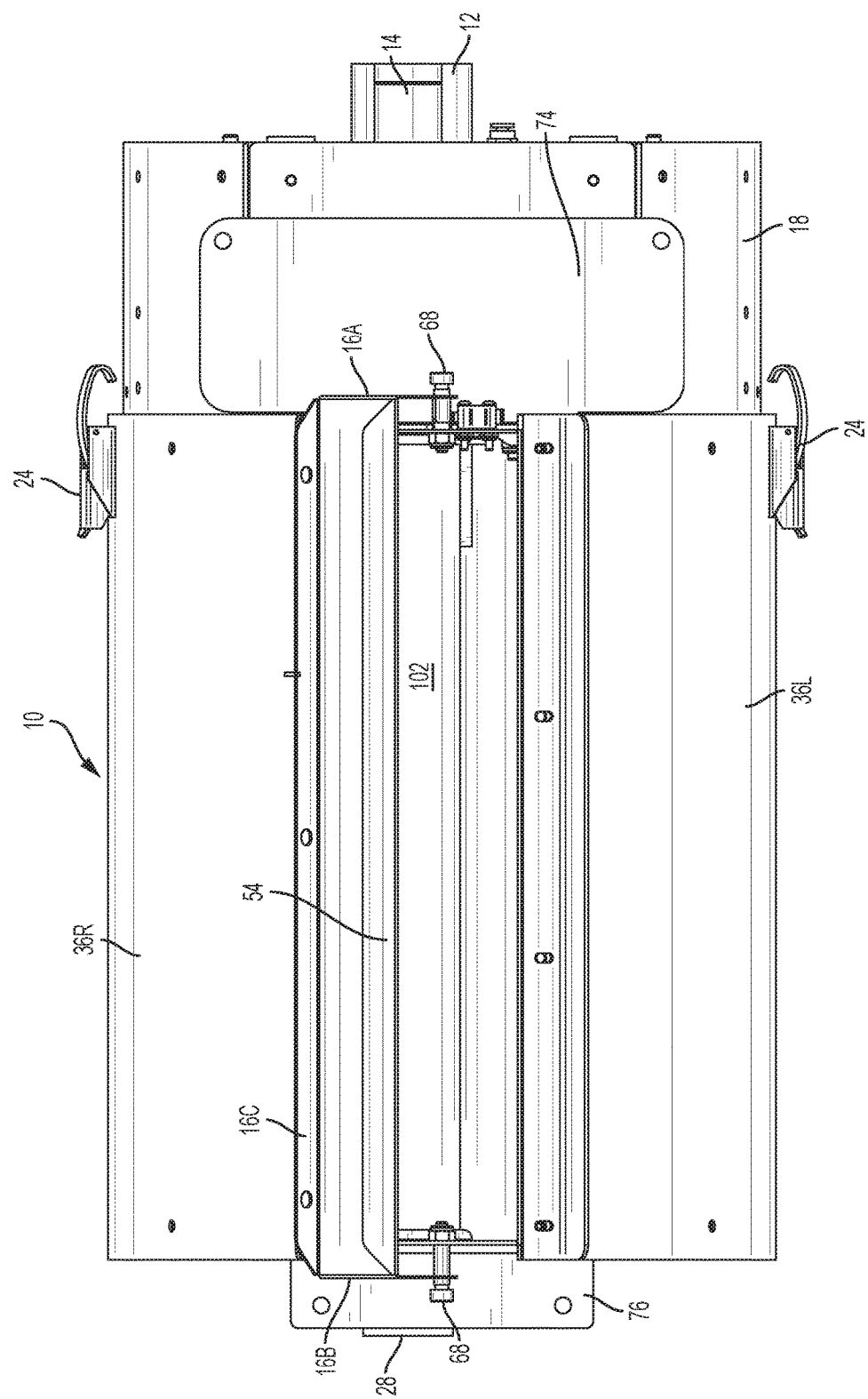
FIG. 7 is a view of the bottom of the receiver illustrated in FIGS. 1 through 6, with the dump flap in an open position for discharge of granular resin material.

Referring to FIG. 7, showing the bottom of receiver 10 with dump flap 16 in the open position, discharge flange 54 is plainly visible as is the open interior 102 of housing 20. Pins 68, about which dump flap 16 rotates, are shown at either end of dump flap 16 engaging left and right triangular portions 16A, 16B of dump flap 16. Shown in a manner similarly to the other views discussed above are material inlet tube 12, piston-cylinder 14, inlet end horizontal blow-back support plate 74, outlet end support plate 76, outlet line 28, and side 36L, 36R of receiver 10.

Figure 8:
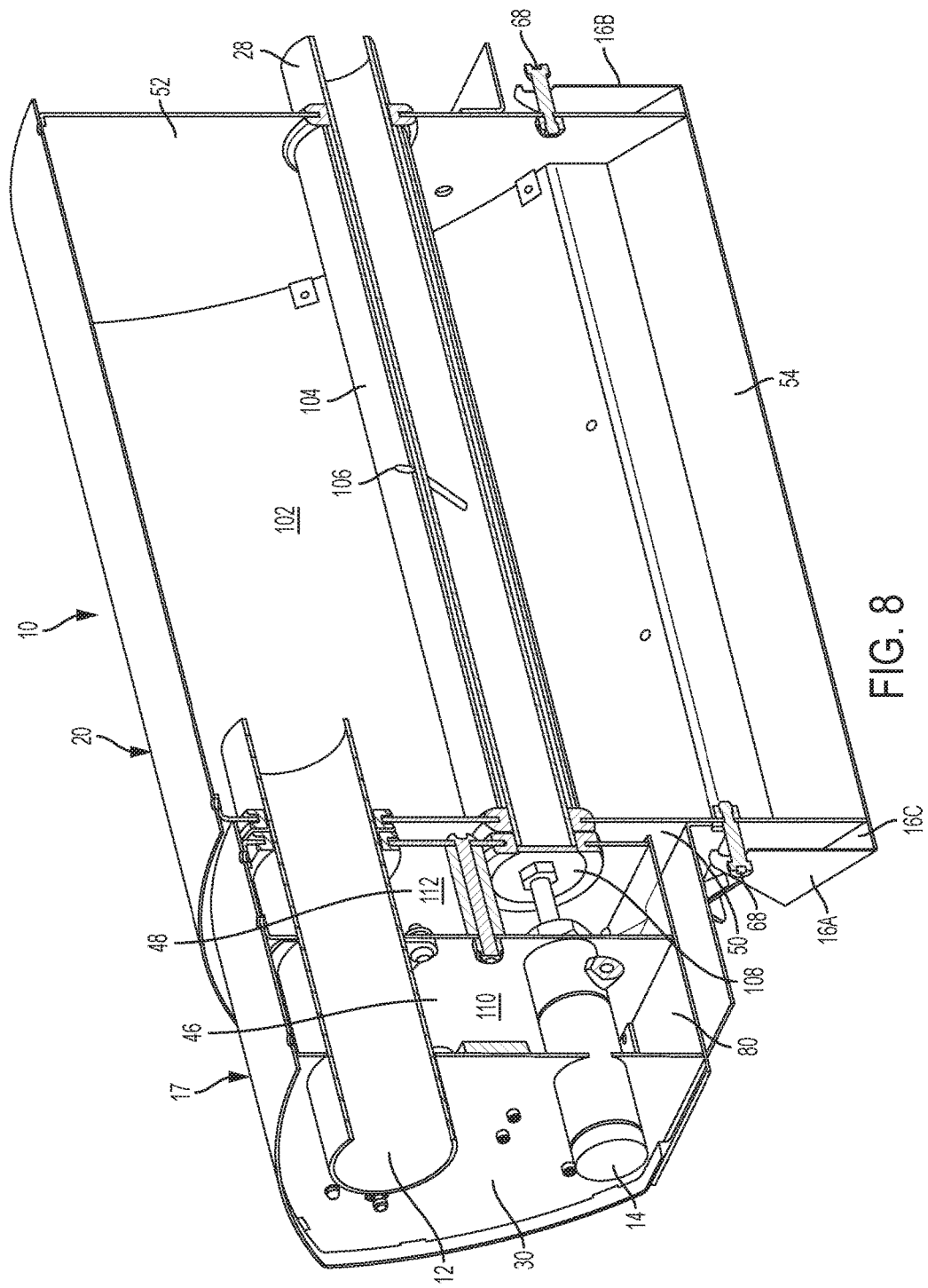
FIG. 8 is a sectional view of the receiver illustrated in FIGS. 1 through 7 taken at lines and arrows 8-8 in FIG. 2, where the dump flap has been illustrated in the open position.
Figure 9:
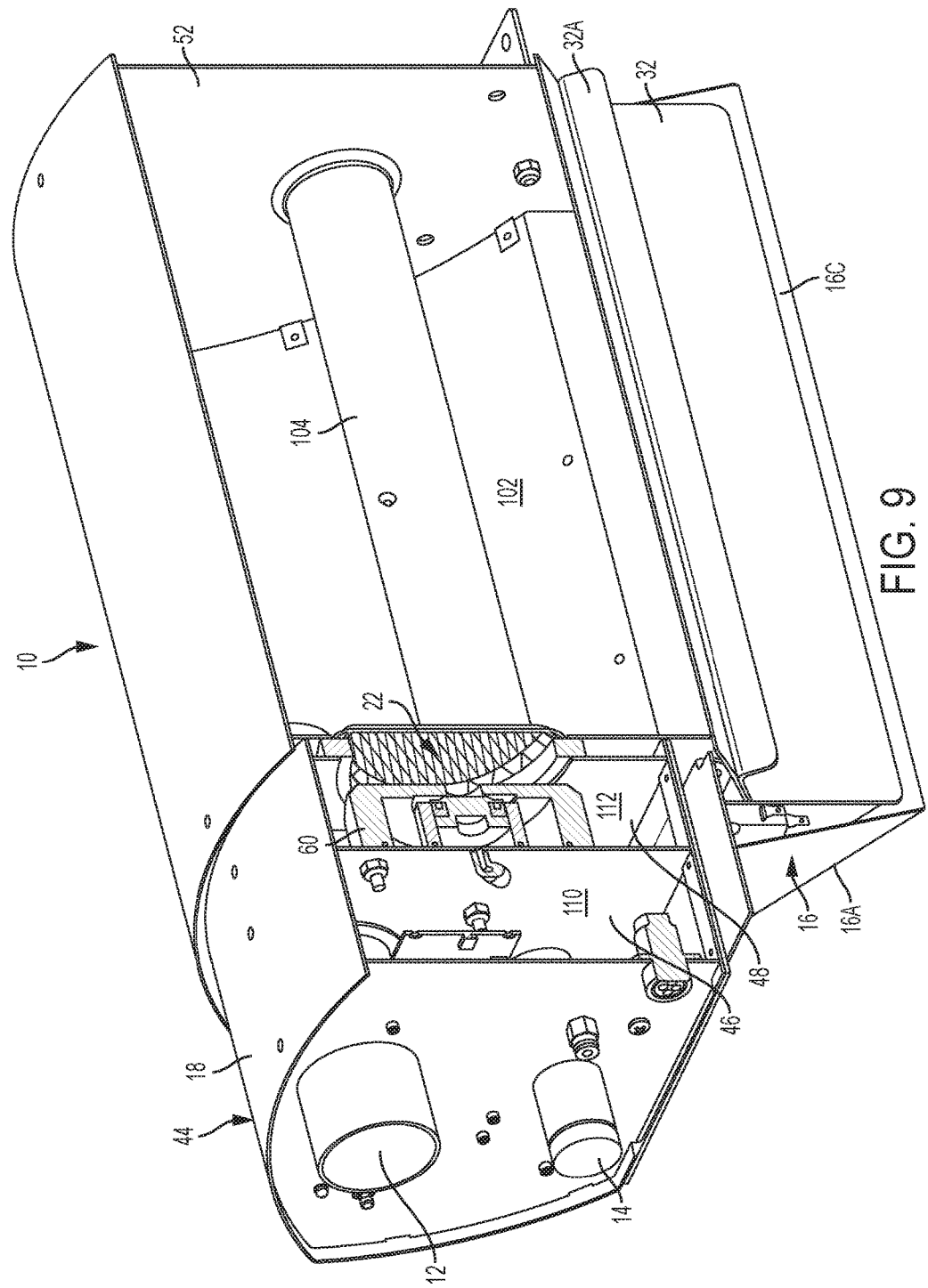
FIG. 9 is a sectional view of the receiver illustrated in FIGS. 1 through 8 taken at lines and arrows 9-9 in FIG. 1, with the dump flap illustrated in the closed position.

Referring principally to FIGS. 8 and 9, in FIG. 8, dump flap 16 is illustrated in the open position at which granular resin material stored within housing 20 self-discharges by means of gravity-induced flow out of housing portion 20 of receiver 10.

Still referring to FIG. 8, the control section for receiver 10 is designated generally 17 and includes two interior compartments, numbered 110 and 112 in FIG. 8. The first interior compartment 110 is bounded by front end plate 30 and by a first intermediate plate designated 46 in FIG. 8. Further bounding first compartment 110 is horizontal support plate 80, effectively forming the floor of both the first and second compartments 110, 112, and a suitable cover piece which has not been illustrated in the drawings for the sake of drawing clarity. Control section 17 further includes a second compartment 112 bounded by first and second intermediate plates 46, 48, by horizontal support plate 80, and by the same upper plate that has not been shown in the drawings to enhance drawing clarity.

First compartment 110 is effectively at ambient pressure, while second compartment 112 must be maintained air tight. As such, compartment 112 is preferably fabricated by welding first and second intermediate plates 46, 48, horizontal support plate 80 and the unnumbered and unshown top plate, as well as sides which are not shown in the drawing, in order to assure air tightness of second compartment 112. Such air-tight construction is required in order for blow-back device 60, described below, to function properly.

Further visible in FIG. 8 is a disk 108 which is secured to the piston rod extending from piston-cylinder 14. Disk 108, when piston-cylinder 14 is actuated, serves to close, in an air tight manner, the end of outlet line 28, namely the inlet opening thereto.

Surrounding outlet line 28 is a spacer 104 held in place by a cotter pin 106 with respect to outlet line 28. Spacer 104 is preferably resilient and serves to maintain the required air tight joint where outlet line 28 passes through rear plate 52 and through front housing plate 50. Front housing plate 50 shown in FIG. 8 is not to be confused with front end plate 30, which is also visible in FIG. 8 as well as in FIG. 2. Outlet line 28 mates with a suitable fitting, not numbered, which receives disk 108 to effectuate an air tight seal when piston-cylinder 14 is actuated and disk 108 assumes the position illustrated in FIG. 8.

Referring to FIG. 9, a preferably cloth filter 22 is mounted in a suitable aperture formed in front plate 50. Adjacent to filter 22 and mounted on first intermediate plate 46 is an air blast device 60 of the type disclosed in U.S. Pat. No. 8,753,432. Air blast device 60, which is sometimes referred to as a "blow-back device", has its air blast outlet axially aligned with filter 22 and oriented such that when the blow-back device 60 delivers a blast of air, the blast of air is directed at filter 22 and contacts filter 22 at a substantially perpendicular angle thereto. This blast of air provided by blow-back device 60 is desirably provided prior to each fill of receiver 10 with granular resin material. Blow-back device 60 keeps filter 22 clean, with dust and fines blown out of filter 22 falling to the bottom of open interior 102 of housing 20. Use of blow-back device 60 and filter 22 assures that no dust or fines are carried with the air/vacuum stream that passes through filter 22 into second compartment 112 and on to the vacuum pump.

The required air/vacuum stream is drawn through filter 22 by the action of a vacuum pump drawing the air/vacuum stream through outlet line 28. Viewing FIG. 8 in connection with FIG. 9, when disk 108 is moved away from the aperture defining the inlet to outlet line 28, namely when disk 108 is moved away from second intermediate plate 48, free flow of the air/vacuum stream from the open interior 102 of housing 20 through filter 22 and into outlet tube 28 results, due to the air tight construction of second compartment 112. By the same token, when piston-cylinder 14 is actuated and disk 108 closes the aperture to outlet tube 28, vacuum is effectively relieved in open interior 102 of housing 20.

The weight of any granular resin material residing in open interior 102 of housing 20 causes dump flap 16 to rotate to the position illustrated in FIG. 2, where discharge chute 38 is open. At this position, granular resin material stored within housing 20 flows downwardly out of housing 20. Note that left and right triangular portions 16A, 16B of dump flap 16 are constructed with a geometry that in the absence of any granular resin material in housing 20 they and the remainder of dump flap 16 will rotate to the closed position illustrated in FIG. 14. When vacuum is applied by draw of an air/vacuum stream at below atmospheric pressure through outlet line 28, vacuum propagates back into interior 102 of housing 20 through second compartment 112 and filter 22, thereby helping to retain dump flap 16 in a closed position. Since the pressure in open interior 102 is lower than atmospheric, this results in an inward closure force against dump flap 16.

Figure 10:
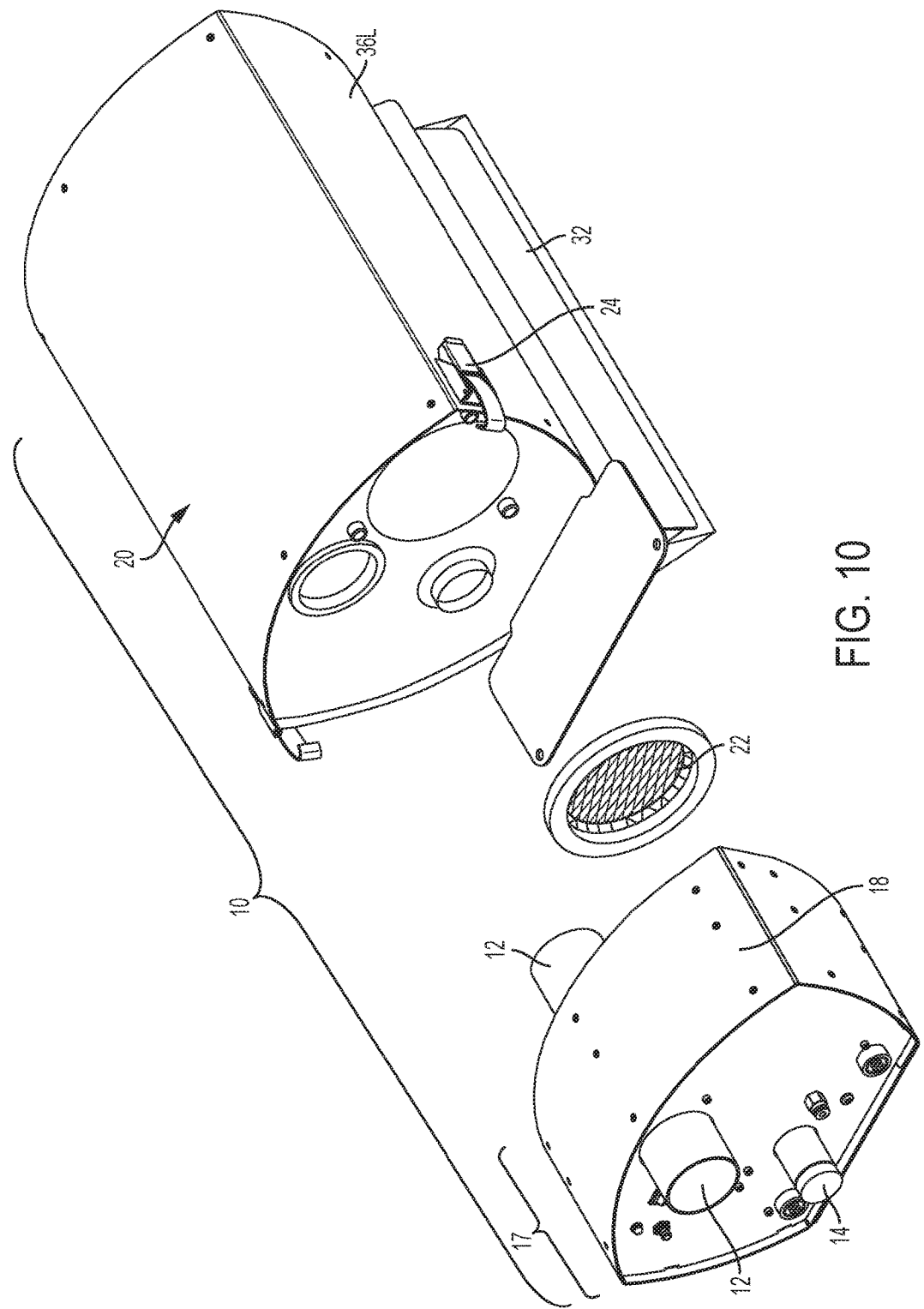
FIG. 10 is an exploded schematic view of the receiver illustrated in FIGS. 1 through 9 showing the modular construction of the receiver.

Referring to FIG. 10, the modular construction of receiver 10 is illustrated. Control section 17 is easily removable from housing 20 in order to change filter 22 as needed. Screw connections and sealing gaskets as illustrated in FIG. 8 are used to retain control section 17 in operating engagement with housing 20. These connections facilitate rapid disassembly of receiver 10 when service is required or a filter 22 must be changed. Clips 24 are easily unfastened to release control section 17 from housing 20. In FIG. 8 second intermediate plate 48 is spaced from front plate 50. With suitable flexible gaskets 114, 116 providing the seal at the aperture defining the inlet to outlet line 28, snaps 24 can be disengaged thereby allowing essentially sliding removal of control section 17 from housing 20.

Figure 11:
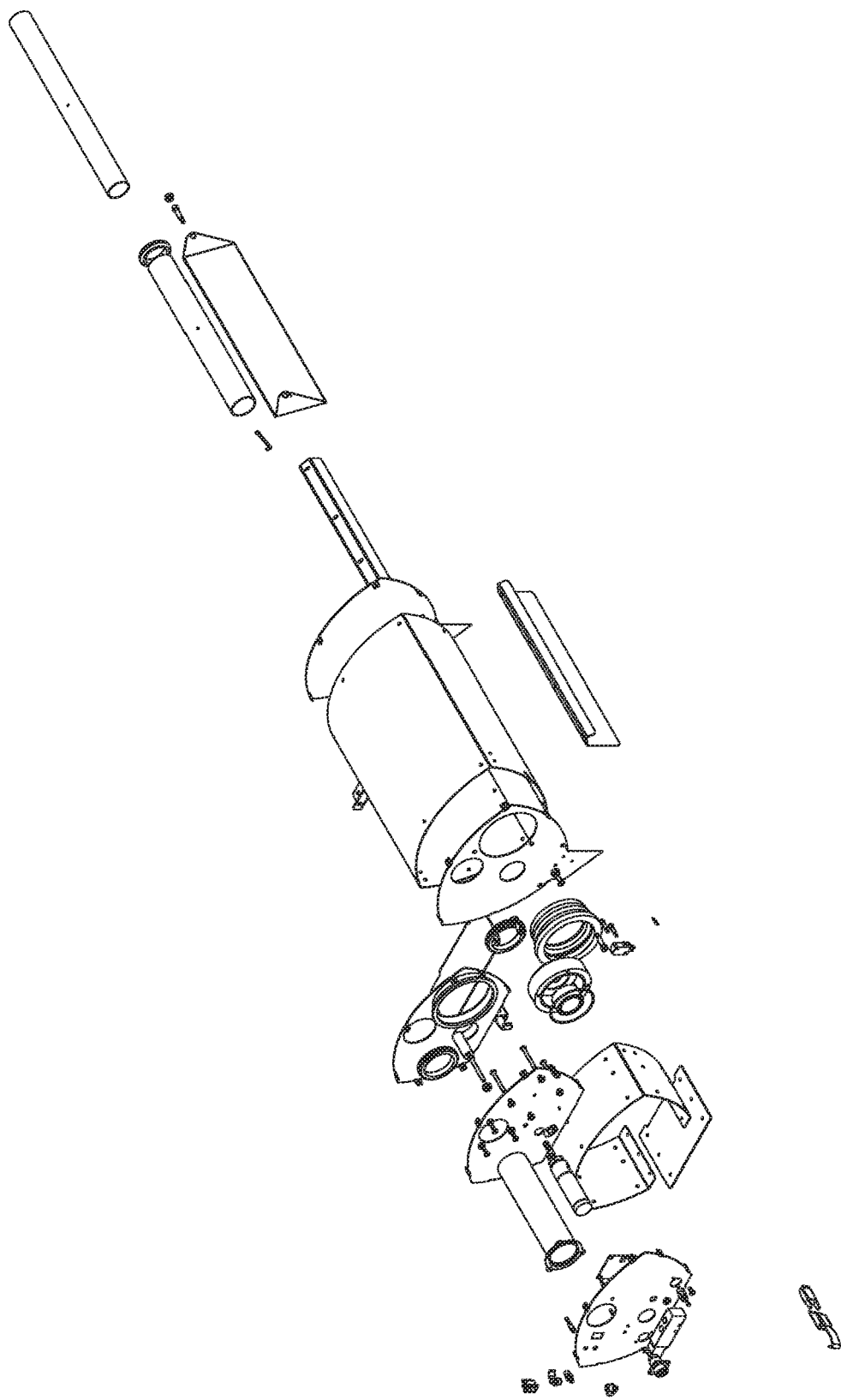
FIG. 11 is an exploded isometric view of the receiver illustrated in FIGS. 1 through 10 showing the receiver parts in detail.

FIG. 11 shows the receiver and all of its parts with the modular construction and separation of control section 17 from housing 20 being immediately apparent.

As noted, dump flap 16 has two triangular portions, denoted 16A and 16B respectively, which are at either end of the dump flap 16. Triangular portion 16A is illustrated in FIG. 2, while triangular portion 16B is illustrated in FIG. 3. Running between triangular portions 16A, 16B is a longitudinally elongated portion 16C of dump flap 16. Elongated portion 16C is more visible in FIG. 9 (as well as in FIG. 7), where dump flap 16 is illustrated in FIG. 9 in the position closing chute 38 and precluding any downward flow of granular resin material out of housing portion 20 of receiver 10. The horizontally elongated portion 16C of dump flap 16 is denoted by two closely spaced double lines in FIGS. 2 and 3.

Preferably there is a three wire cable connected to the receiver control, leading to the receiver from a power unit which desirably provides power to the vacuum pump creating the vacuum to draw the air-material mixture into the receiver. Two of the wires from the power supply are preferably in the vacuum pump control, which supplies the required 24 volts to receiver. The third wire is a signal wire. When the receiver requires granular resin material and the dump flap is closed, this third wire provides power to the signal line and the microprocessor knows to turn receiver 10 on.

Each receiver 10 preferably includes such a microprocessor. Additionally, there is a microprocessor preferably provided in power unit. The microprocessor in the receiver preferably detects that the dump flap has closed and tells the power unit associated with the vacuum pump to run for a set time period, which has been previously computed and entered into the microprocessor. Otherwise receiver 10 may run until a high material level sensor in receiver 10 is covered, indicating receiver 10 is full of granular resin material. A timer portion of the microprocessor acts as a safety time-out so that receiver 10 does not run forever in the event of a blockage of granular resin material or in the event that no granular resin material is available from the source.

Housing top 42 and housing sides 36L, 36R are all curved outwardly. This outward curvature of housing top 42 and housing sides 36L, 36R resists the atmospheric pressure producing force against those sides 36L, 36R and housing top 42. The force of the atmospheric pressure tends to push the housing top 42 and housing sides 36L and 36R inwardly due to the vacuum (actually slightly sub-atmospheric pressure) present within the housing portion of receiver 10 during operation. The curved, convex shape of sides 36L, 36R and housing top 42 facilitate the small size, compact design and high capacity characteristics of receiver 10.

Dump flap 16 and particularly triangular portions 16A, 16B of dump flap 16 are configured for pivotal movement of dump flap 16 about pins 68. As noted above, the configuration and weighting of dump flap 16, and particularly the weighting of left and right triangular portions 16A, 16B and longitudinal portion 16C of dump flap 16, cause dump flap 16 to rotate into the closed position shown in FIG. 13. When dump flap 16 reaches the closed position, the vacuum drawn by the vacuum pump maintains dump flap 16 at that closed position.

Air cylinder 14 effectively controls flow of air and the air or vacuum and resin material mixture through receiver 10. As illustrated in FIG. 8, air cylinder 14 includes a shaft portion extending therefrom with a circular disk 108 being mounted on the extremity of shaft portion 70; the circular disk is designated 108 in FIG. 8. When air cylinder 14 is actuated, shaft portion 70 extends therefrom and circular disk 108 closes the opening to outline line 28.

During operation, as receiver 10 is receiving granular resin material entrained in the vacuum/air stream coming in through material inlet tube 12, dump flap 16 is retained in closed position due to the suction force of the vacuum pump drawing through outlet line 28. Once vacuum is shut off, either through shut off of the vacuum pump, or through actuation of air cylinder 14 closing outlet line 28 and thereby precluding further draw of vacuum through receiver 10, or if the weight of the granular resin material becomes great enough to overcome the vacuum suction tending to keep dump flap 16 in the closed position, dump flap 16 moves to an open position as dump flap 16 is forced open by the weight of resin material within receiver 10.

During operation dump flap 16 opens due to the weight of the granular resin material pellets residing within housing 20 of receiver 10 and resting on dump flap 16. Without the weight of the granular resin material, or once the granular resin material has flowed out of the receiver, the dump flap swings closed due to the force of gravity and the configuration of the dump flap, particularly the geometry of dump flap left and right triangular portions 16A, 16B, and longitudinally extending portion 16C. In the normal hanging position, dump flap 16 is closed, with the exception of a slight gap between the flap surface and the edge of the opening to the open interior 102 of housing 20.

Dump flap 16 may be held open by a pile of granular resin material when the receiver dumps a load of granular resin material onto a pile of granular resin material that has just fallen out of receiver 10 and, for example, is resident in a hopper, not shown in the drawings and not a part of receiver 10, located below dump flap 16. In such case, when granular resin material is dumped, dump flap 16 opens and the granular resin material may not have room to flow completely out of receiver 10, due to presence of the previously dumped pile(s) being immediately below receiver 10.

As granular resin material is used by an associated process machine, any granular resin material remaining in receiver 10 flows out. When the pile of previously dumped granular resin material below receiver 10 drops to a level below dump flap 16, dump flap 16 swings shut and another batch of granular resin material may be loaded into receiver 10. Vacuum pulls dump flap 16 tight to create a vacuum seal allowing the vacuum feed of an air/vacuum stream carrying granular resin material into the open interior 102 of housing 20.

Figure 12:
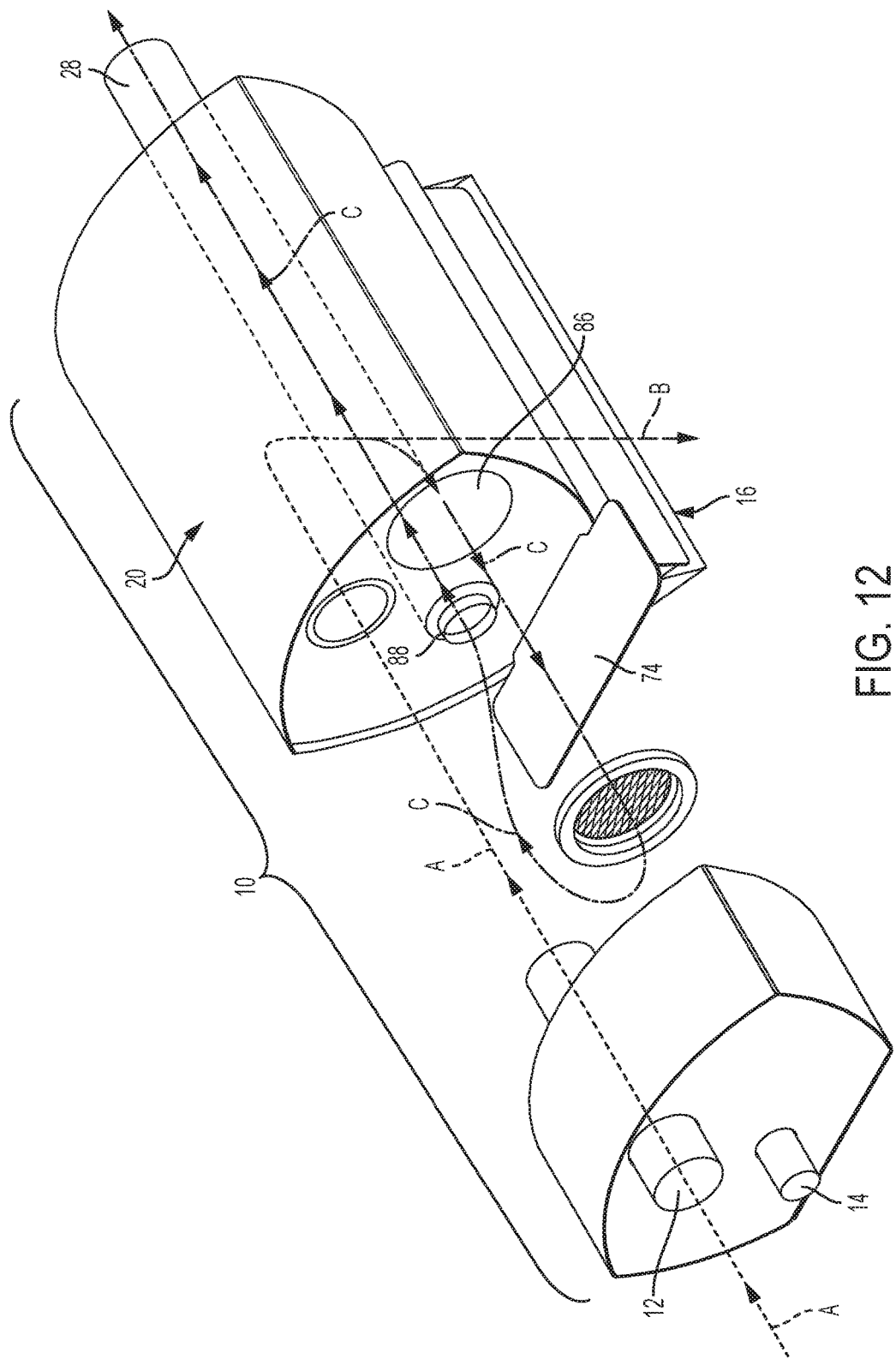
FIG. 12 is an exploded isometric schematic view of certain components of the receiver illustrated in FIGS. 1 through 11, with lines and arrowheads provided to illustrate the flow of the conveying vacuum/air stream and conveyed granular resin material through the receiver.

In FIG. 12, receiver 10 is illustrated schematically. Not all of the components of receiver 10 have been numbered or shown in detail in FIG. 12 in order to enhance the clarity of the drawing. FIG. 12 depicts the flow of vacuum/air and material through receiver 10.

Specifically, a vacuum/air stream carrying granular resin material enters receiver 10 via inlet tube 12 as indicated by dotted line and arrows A. The vacuum/air granular material mixture passes into the interior of housing 20, where the granular resin falls out of the vacuum/air stream in a downward direction due to the force of gravity because the air/vacuum stream, having entered a larger air space volume, namely the open interior of housing 20, is at a greatly reduced velocity from the air/vacuum stream velocity in a conduit leading to inlet tube 12.

At the lower velocity, the granules of resin material fall out of the air/vacuum stream. This flow of the granular resin material downwardly is indicated by longer dotted lines and arrow B in FIG. 12. The vacuum/air stream, being pulled by a vacuum pump not shown in FIG. 12, is drawn out of the interior of housing 20 as indicated by arrows C and the line consisting of long dashes and short dashes in FIG. 12. The vacuum/air mixture flows out of the interior of housing 20 in a direction towards the control section 17 of receiver 10, in a direction opposite that of arrow A. The vacuum/air stream passes through filter 22, where fines and dust are removed from the vacuum/air mixture moving through filter 22, with filter 22 being mounted in a filter opening 86. The vacuum/air mixture, having been cleaned of dust and fines turns and enters outlet line 28 through fitting 88, travels through outlet line 28, leaving receiver 10 and goes on to a vacuum pump. The granular resin material, upon accumulating to an amount sufficient in weight to cause dump flap 16 to open, falls out of the open interior 102 of housing 20 in response to gravity.

A major advantage of material inlet tube 12 and outlet line 28 being horizontal, and entering and leaving receiver 10 respectively through apertures formed in vertically extending surfaces of receiver 10, results in receiver 10 having a very low height, thereby providing room for other components in a plastic resin processing facility.

As discussed above and from the foregoing description of the exemplary embodiments of the invention, it will be readily apparent to those skilled in the art to which the invention pertains that the principles and particularly the structures disclosed herein and the methods of use thereof can be used for applications other than those specifically mentioned. All such applications of the invention are intended to be covered by the appended claims unless expressly excluded therefrom.

The invention may be embodied in other specific forms without departing from the spirit or essential characteristics of the invention. The disclosed embodiments are therefore to be considered in all respects as illustrative and not restrictive with the scope of the invention being indicated by the appended claims rather than by the foregoing description. All changes which come within the meaning and range of equivalency of the claims are therefore intended to be embraced therein.

As used in the claims herein, the term "comprising" means "including" while the term "consisting of" means "including so much and no more" and the term "consisting essentially of" means including the recited elements and those minor accessories required and known to be used in the art to facilitate the invention as claimed. The scope of the invention is, therefore, indicated by the appended claims rather than by the foregoing description and all changes which come within the range of equivalency of the claims are to be considered to be embraced within the scope of the claims.

I claim the following:

1. A method for temporary storage of granular material prior to processing thereof into a finished or semi-finished product, comprising,
    a) feeding an air/vacuum stream carrying the granular material into a chamber under vacuum;
    b) reducing velocity of the stream in the chamber thereby causing granular material entrained in the stream to fall to the chamber bottom;
    c) continuing drawing the stream from the chamber thereby maintaining vacuum in the chamber;
    d) releasing the vacuum horizontally from the chamber thereby allowing a bottom of the chamber to swing to an open position, in response to granular material resting thereon.

2. The method of claim 1 wherein releasing the vacuum horizontally from the chamber comprises releasing the vacuum through a horizontal outlet line.

3. The method of claim 1 further comprising passing the stream through a filter after the granular material has fallen to the chamber bottom.

4. The method of claim 3 wherein passing the stream through the filter is performed before releasing the vacuum from the chamber.

5. A method for temporary storage of granular material prior to processing thereof into a finished or semi-finished product, comprising:
    a) drawing a vacuum stream carrying granular material in a transport conduit to a chamber, the chamber having cross-sectional area larger than that of the conduit;
    b) introducing the vacuum stream into the chamber thereby
        i) causing speed of the vacuum stream to decrease and causing the carried granular material to drop to the bottom of the chamber; and
        ii) closing the chamber bottom as the vacuum acts to provide force on a chamber movable bottom member;

c) maintaining the chamber bottom closed by continuing to draw vacuum in the chamber;
d) releasing vacuum from the chamber thereby allowing the movable bottom member to open in response to weight of granular material resting thereon thereby permitting gravity induced flow of granular material downward out of the chamber; and
e) passing the stream through a filter in a wall of the chamber while vacuum continues to be drawn after the granular material has fallen to the chamber bottom.

6. The method of claim 5 further comprising passing the stream through a filter perpendicular to the stream.

7. The method of claim 5 further comprising passing the stream horizontally through a filter perpendicular to the stream.

8. A method for temporary storage of granular material prior to processing thereof into a finished or semi-finished product, comprising,
a) feeding an air/vacuum stream carrying the granular material into a chamber under vacuum;
b) reducing velocity of the stream in the chamber thereby causing granular material entrained in the stream to fall to the chamber bottom;
c) continuing drawing the stream from the chamber thereby maintaining vacuum in the chamber;
d) releasing the vacuum horizontally from the chamber thereby allowing a bottom of the chamber to swing to an open position, in response to granular material resting thereon; and
e) passing the stream through a filter after the granular material has fallen to the chamber bottom and before releasing the vacuum from the chamber.

9. The method of claim 8 further comprising passing the stream through a filter perpendicular to the stream.

10. The method of claim 8 further comprising passing the stream horizontally through a filter perpendicular to the stream.

11. A method for temporary storage of granular material prior to processing thereof into a finished or semi-finished product, comprising:
a) drawing a vacuum stream carrying granular material in a transport conduit to a chamber, the chamber having cross-sectional area larger than that of the conduit;
b) introducing the vacuum stream into the chamber thereby
  i) causing speed of the vacuum stream to decrease and causing the carried granular material to drop to the bottom of the chamber; and
  ii) closing the chamber bottom as the vacuum acts to provide force on a chamber movable bottom member;
c) maintaining the chamber bottom closed by continuing to draw vacuum in the chamber;
d) releasing vacuum from the chamber thereby allowing the movable bottom member to open in response to weight of granular material resting thereon thereby permitting gravity induced flow of granular material downward out of the chamber; and
e) passing the stream through a filter in a direction opposite to that in which the stream enters the filter, while vacuum continues to be drawn after the granular material has fallen to the chamber bottom.

12. A method for temporary storage of granular material prior to processing thereof into a finished or semi-finished product, comprising:
a) drawing a vacuum stream carrying granular material in a transport conduit to a chamber, the chamber having cross-sectional area larger than that of the conduit;
b) introducing the vacuum stream into the chamber thereby
  i) causing speed of the vacuum stream to decrease and causing the carried granular material to drop to the bottom of the chamber; and
  ii) closing the chamber bottom as the vacuum acts to provide force on a chamber movable bottom member;
c) maintaining the chamber bottom closed by continuing to draw vacuum in the chamber;
d) releasing vacuum from the chamber thereby allowing the movable bottom member to open in response to weight of granular material resting thereon thereby permitting gravity induced flow of granular material downward out of the chamber; and
e) passing the stream through a filter while vacuum continues to be drawn after the granular material has fallen to the chamber bottom; wherein the stream enters the chamber through the same wall as houses the filter.

13. A method for temporary storage of granular material prior to processing thereof into a finished or semi-finished product, comprising:
a) drawing a vacuum stream carrying granular material in a transport conduit to a chamber, the chamber having cross-sectional area larger than that of the conduit;
b) introducing the vacuum stream into the chamber thereby
  i) causing speed of the vacuum stream to decrease and causing the carried granular material to drop to the bottom of the chamber; and
  ii) closing the chamber bottom as the vacuum acts to provide force on a chamber movable bottom member;
c) maintaining the chamber bottom closed by continuing to draw vacuum in the chamber;
d) releasing vacuum from the chamber thereby allowing the movable bottom member to open in response to weight of granular material resting thereon thereby permitting gravity induced flow of granular material downward out of the chamber; and
e) passing the stream through a filter while vacuum continues to be drawn after the granular material has fallen to the chamber bottom and before releasing the vacuum from the chamber.

* * * * *